(12) United States Patent
Hughes et al.

(10) Patent No.: US 6,326,765 B1
(45) Date of Patent: Dec. 4, 2001

(54) ELECTRIC SCOOTER WITH ON-BOARD CHARGING SYSTEM

(75) Inventors: Peter S. Hughes, South Harwich, MA (US); James Daniel Baldwin, Pawtucket, RI (US)

(73) Assignee: Vectrix Corporation, Newport, RI (US)

( * ) Notice: Subject to any disclaimer, the term of this patent is extended or adjusted under 35 U.S.C. 154(b) by 0 days.

(21) Appl. No.: 09/679,408

(22) Filed: Oct. 4, 2000

(51) Int. Cl.[7] ............................................... H01M 10/46
(52) U.S. Cl. ...................................................... 320/104
(58) Field of Search ........................ 320/103, 104, 320/101, DIG. 33, DIG. 34; 180/65.3, 65.4; 429/12, 13

(56) References Cited

U.S. PATENT DOCUMENTS

| | | |
|---|---|---|
| 4,094,374 | 6/1978 | Adams . |
| 4,931,947 | 6/1990 | Werth et al. . |
| 4,961,151 | 10/1990 | Early et al. . |
| 4,962,462 | 10/1990 | Fekete . |
| 5,207,288 | 5/1993 | Ono . |
| 5,310,016 | 5/1994 | Rudelle . |
| 5,332,630 | 7/1994 | Hsu . |
| 5,396,970 | 3/1995 | Ono . |
| 5,412,268 | 5/1995 | Arnaud et al. . |
| 5,421,427 | 6/1995 | Ogawa et al. . |
| 5,477,936 | 12/1995 | Sugioka et al. . |
| 5,485,064 | 1/1996 | Arnaud et al. . |
| 5,501,292 | 3/1996 | Kawashima et al. . |
| 5,513,721 | 5/1996 | Ogawa et al. . |
| 5,539,296 | 7/1996 | Ito . |
| 5,540,037 | 7/1996 | Lamb et al. . |
| 5,577,747 | 11/1996 | Ogawa et al. . |
| 5,594,411 | 1/1997 | Ono . |
| 5,613,569 | 3/1997 | Sugioka et al. . |
| 5,631,532 | 5/1997 | Azuma et al. . |
| 5,657,830 | 8/1997 | Kawashima et al. . |
| 5,713,426 | 2/1998 | Okamura . |
| 5,765,656 | 6/1998 | Weaver . |
| 5,767,584 | 6/1998 | Gore et al. . |
| 5,771,475 | 6/1998 | Tabata et al. . |
| 5,786,640 | 7/1998 | Sakai et al. . |
| 5,831,409 | 11/1998 | Lindberg et al. . |
| 5,853,058 | 12/1998 | Endo et al. . |
| 5,858,568 | 1/1999 | Hsu et al. . |
| 5,894,898 | 4/1999 | Catto . |
| 5,905,360 | 5/1999 | Ukita . |
| 5,912,545 | 6/1999 | Monet et al. . |
| 5,929,594 | 7/1999 | Nonobe et al. . |
| 5,931,245 | 8/1999 | Uetake et al. . |
| 5,941,328 | 8/1999 | Lyons et al. . |
| 5,950,752 | 9/1999 | Lyons . |
| 5,965,996 | 10/1999 | Arledge et al. . |
| 6,011,378 | 1/2000 | Tabata et al. . |
| 6,037,726 | 3/2000 | Tabata et al. . |
| 6,047,786 | 4/2000 | Stevenson et al. . |
| 6,054,818 | 4/2000 | Tabata et al. . |

*Primary Examiner*—Edward H. Tso
(74) *Attorney, Agent, or Firm*—Pennie & Edmonds LLP (57) ABSTRACT

A two-wheeled electric scooter principally powered by batteries which together provide more than 100 volts. The scooter carries an onboard recharging system to replenish the battery supply. Accordingly, the onboard recharging system is not called upon to provide the main power source for acceleration and other operating conditions. A recharging system is implemented either as a fuel cell which trickle charges the battery, or an internal combustion engine which recharges the battery through a mechanical charging unit such as an alternator or generator. Regenerative braking is provided so as to further conserve energy by back driving the motor to recharge the battery pack during braking. Connections are provided for an external power source such as an AC outlet to be plugged into the scooter so as to provide an alternate mechanism to recharge the batteries.

14 Claims, 9 Drawing Sheets

1.9 kWh 120V
(16 Ah SLA)

*Fig. 7a*

3.1 kWh 120V
(26 Ah SLA)

*Fig. 7b*

3.1 kWh 120V
1.9 kWh 120V
(24 Ah Ni-Zn)

ELECTRIC SCOOTER WITH ON-BOARD CHARGING SYSTEM

RELATED APPLICATIONS

NONE

TECHNICAL FIELD

The present invention relates to electric scooters in which an on-board charging system is provided to recharge the batteries.

BACKGROUND OF THE INVENTION

Electric scooters are well known in the prior art. Typically electric scooters have a bank of batteries which provide power to drive the motor. These batteries must be recharged from time to time. This is typically done by plugging the batteries into an AC power outlet for some period of time to restore the depleted energy. Recharging circuits for electrical scooters, such as that disclosed in U.S. Pat. No. 5,965,996, have been developed for the purpose of uniformly charging batteries. In the aforementioned '996 patent a total of ten 12 volt batteries are provided on the scooter. Due to the weight and volume of so many batteries, scooters may need to develop special frames or the like to support this added weight and volume. U.S. Pat. No. 6,047,768 is directed to a scooter frame which can accommodate ten such 12-volt batteries.

In recent years, there has been considerable interest in placing battery recharging units and battery energy conserving units permanently onboard electric vehicles. U.S. Pat. No. 5,631,532 entitled "Fuel cell/battery hybrid power system for vehicle" exemplifies the use of a fuel cell to recharge a battery in an electric vehicle. U.S. Pat. No. 5,713,426 discloses the use of regenerative braking to returning energy by back-driving the motor mechanism. However, neither of these references disclose such device in conjunction with an electric scooter.

What is desirable is an electric scooter which has an onboard charging system that recharges batteries, the batteries being used as the principal power source to propel the scooter.

SUMMARY OF THE INVENTION

The present invention is realized by a two-wheeled electric scooter having a frame sufficient to accommodate batteries which collectively provide the capacity to propel the scooter at accelerations and velocities comparable to that of general traffic flow. In addition to a frame and batteries, the electric scooter of the present invention includes an electric motor, an onboard recharging source for recharging the batteries, an interface to an external power source for rapid recharging of the batteries and control and monitoring mechanisms to help regulate battery consumption and restoration.

In one aspect of the invention, the recharging source is a fuel cell which provides a trickle charge to the batteries through a DC-DC converter. Either methanol or hydrogen may be used as the fuel to drive the fuel cell as appropriate.

In another aspect of the invention, the charging source is an internal combustion engine using either gasoline, diesel or other fuel, which charges the batteries via a mechanical charging unit such as an alternator or generator.

In yet another aspect of the present invention, regenerative braking circuit is supplied which charges the batteries with energy harnessed during deceleration.

BRIEF DESCRIPTION OF THE DRAWINGS

The present invention can better be understood through the attached figures in which.

DETAILED DESCRIPTION OF THE INVENTION

The aforementioned U.S. Pat. Nos. 5,965,996, 6,047,768, 5,631,532 and 5,713,426 are incorporated by reference to the extent necessary to understand the present invention.

Figure 1:
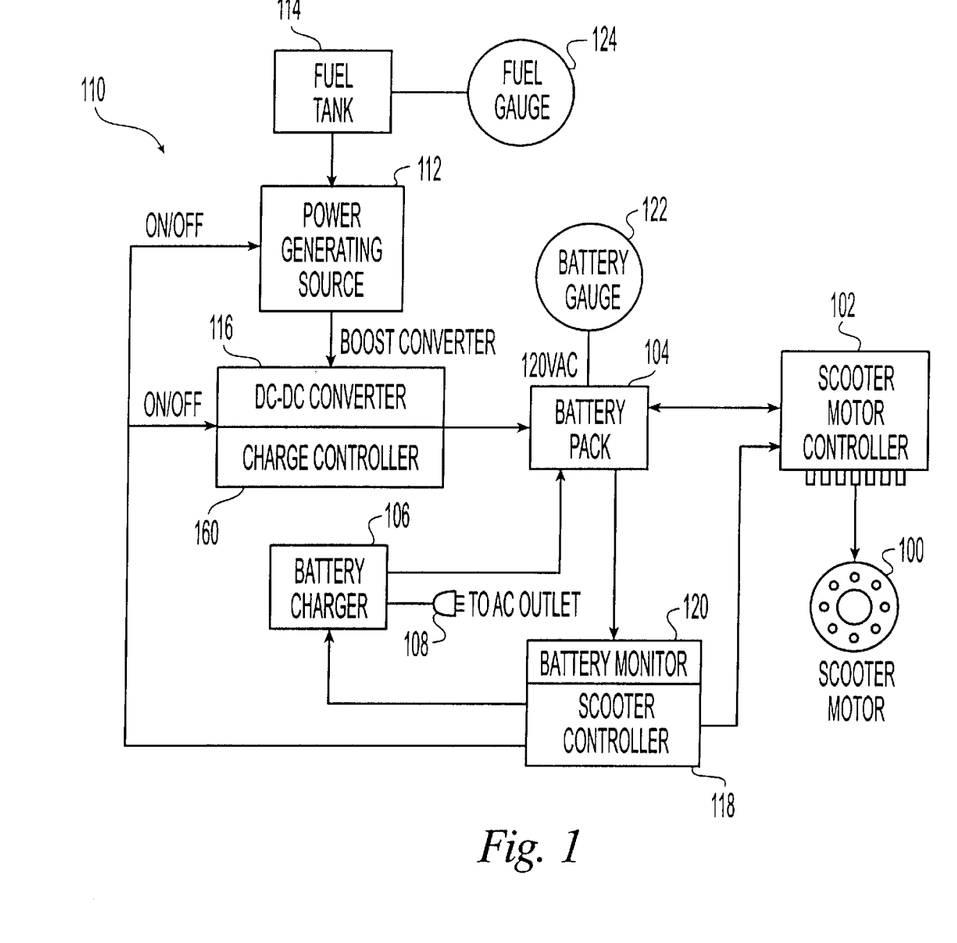
FIG. 1 shows a functional block diagram of the components used to support the present invention.

FIG. 1 presents a block diagram showing the functional components associated with the present invention. An electric scooter motor 100 provides the driving power to drive the scooter. Preferably scooter motor 100 is a three-phase slotted brushless permanent magnet motor, specially made by Kollmorgen Corporation (www.kollmorgen.com) for the present purposes. While Table 1 below lists the specifications of the motor used in a preferred embodiment of the present invention, it should be kept in mind that countless other specifications may also suffice.

Scooter motor 100 receives a three-phase voltage from scooter motor controller 102. Preferably scooter motor controller 102 outputs a variable waveform, such as pulse width modulation, to drive the scooter motor 100. The scooter motor controller 102 includes high power semiconductor switches which are gated (controlled) to selectively produce the waveform necessary to connect the battery pack 104 to the scooter motor.

Battery pack 104 preferably includes sufficient batteries connected in series to output at least 100 VDC as discussed further below. The battery pack 104 preferably comprises either lead-acid batteries or Ni—Zn batteries. Regardless of which types of batteries are used, it is crucial for the purposes of the present invention that the batteries be rechargeable.

TABLE 1

| Motor Parameters @ 25° C. & 120 VDC | |
|---|---|
| Characteristic | Feature |
| Type | Permanent magnet |
| Peak Power | 20 kW |
| Peak Torque | 65.6 N-m |
| Current @ Peak Torque | 325 Amps |
| Maximum Speed | 5500 RPM |

TABLE 1-continued

Motor Parameters @ 25° C. & 120 VDC

| Characteristic | Feature |
| --- | --- |
| Maximum Winding Temperature | 155° C. |
| Temperature rise per Watt | 0.5° C./watt without forced air |
| Continuous Torque | 22.8 N-m |
| Airgap | 0.082 inches |
| Winding DC Resistance | 63 mΩ ± 10% |
| Winding Inductance | 80 mH ± 30% |
| Number of Poles | 8 |
| Rotor Inertia | 0.0093 kg-m$^2$ |
| Motor Weight | 7.7 kg maximum |
| Number of Phases | 3 |
| Winding Configuration | Wye |
| Lamination Material | Low Loss Iron |
| Slot configuration | Straight |
| Stator Inside Dimension | 5.8 inches (147 mm) |
| Stator Outside Dimension | 7.3 inches (185 mm) |
| Stator Stack Length | 1.95 inches (50 mm) |
| Static Friction | 0.8 N-m |
| Torque Sensitivity | 0.118 N-m per Ampere Peak |
| Back EMF Constant | 0.118 Volts per Radian per Second |
| Magnet Material | Neodymium Iron Boron |
| Cooling | Passive via Motor Side Swingarm |
| Winding Insulation | Nema Class H, min withstand 600 V RMS |

A conventional battery charger 106, is one way in which the battery pack 104 is recharged. Battery charger 106 may reside onboard the scooter and is connectable to an AC outlet via a plug 108 or the like. Alternatively, the battery charger 106 may remain off of the vehicle and be connected to the scooter only during high current charging sessions.

In addition to the battery charger 106, which connects to an AC outlet to recharge the battery pack, an onboard charging system 110 is also provided on the scooter. The onboard charging system comprises an onboard power generating source 112, a fuel supply 114 which feeds the onboard power generating source 112, and a converter/charge controller 116 which transforms the output of the onboard power generating source 112 into a form suitable for charging the battery pack 104.

A scooter controller 118 sends signals to the motor controller 102, the battery charger 106 (when provided onboard the scooter), the onboard power generating source 112, and the converter/charge controller 116. The charge of the battery pack is monitored via a battery monitor 120 which, in turn, is connected to the scooter controller 118 to provide information which may affect the operation of the scooter controller. The energy state of the battery pack is displayed on a battery gauge 122 so that the user can monitor the condition of the battery pack, much like a fuel gauge is used a gasoline powered scooter. The status of the fuel supply 114 is similarly displayed on a fuel gauge 124 for the user's convenience.

Figure 2A:
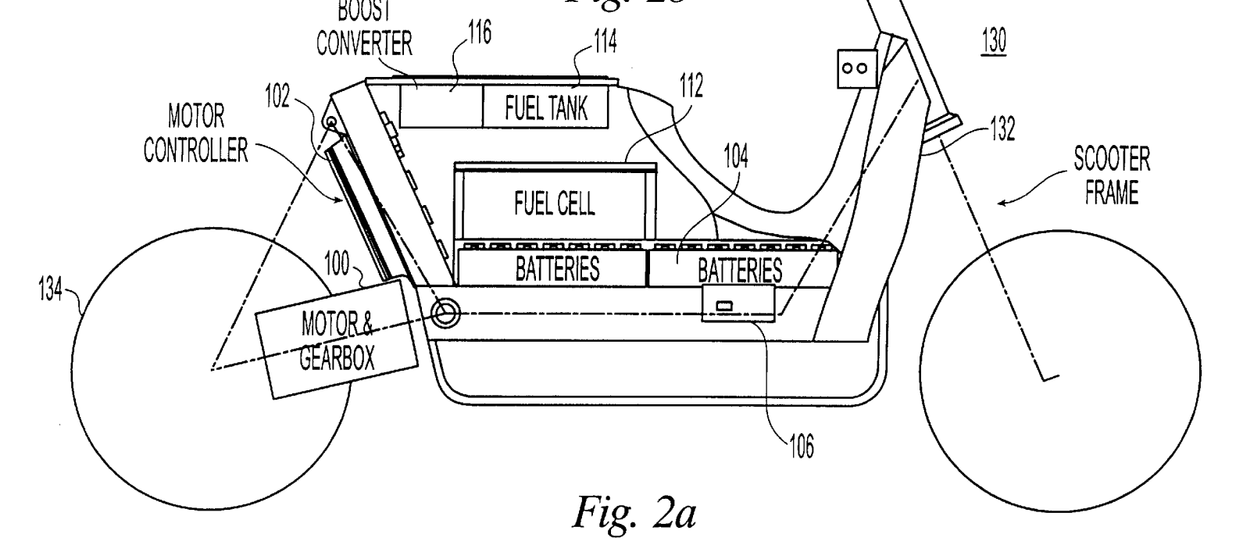
FIGS. 2a and 2b show a side and a plan view, respectively, indicating the arrangements of the various components of FIG. 1 in an electric scooter.
Figure 2B:
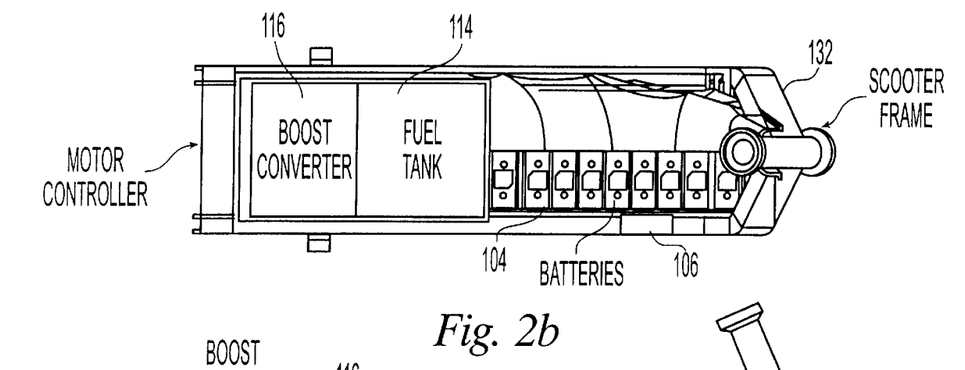

FIGS. 2*a* and 2*b* show many of the block diagram components of FIG. 1 as arranged on a motor scooter 130. Scooter 130 has a scooter frame 132 not unlike that shown in U.S. Pat. No. 6,047,786. The battery pack 104 is arranged so that the scooter has a relatively low center of gravity. While FIGS. 2*a* and 2*b* show the battery pack to be a linear arrangement of batteries having substantially similar vertical positions, it should be kept in mind that the batteries may be arranged in different configurations so as to optimize space in the scooter frame. The onboard power generation source 112 is seen in FIG. 2*a* to be positioned just above the battery pack with the fuel supply 114 positioned thereabove. Preferably, the fuel supply 114 is easily accessible from outside the scooter so as to facilitate both refueling and replacement. The fuel supply 114 may be integrally formed with the onboard power generation source 112. The scooter motor 100, along with its associated gear box, drives the rear wheel 134 of the scooter and is positioned in the vicinity of the frame 132 and the rear wheel 134. The scooter motor controller 102 is positioned near the interior portion of the frame so as to minimize the distance between it and the motor 100. The battery charger 106 is preferably positioned and close to the battery pack and therefore at a relatively low position so as to facilitate connection to an external power supply. Lastly, the battery gauge 122 and the fuel supply gauge 124 are positioned near the front of the scooter so as to facilitate viewing by a user.

In a first preferred embodiment, the onboard power generating source 112 is a fuel cell and the fuel supply 114 is either hydrogen or methanol depending on the nature of the fuel 112. In a preferred embodiment, a Power PEM-PS® family fuel cell available from H-power (www.hpower.com) is used. This family of DC power sources based on a fuel cell provides approximately 250–500 watts continuously. Such a system operates on ambient air and clean pressurized hydrogen fuel from the fuel tank 114. This type of fuel cell comprises a cell stack of a proton exchange membrane type (PEM), mechanical auxiliaries and an electronic control module. A fuel cell such as this provides a relatively low power onboard power source which operates at a continuous, steady state output. This provides a constant trickle charge to the battery pack 104 via the DC—DC converter/charge controller. As stated above, the fuel cell 112 normally works on a continuous basis. However, it may selectively be turned on or off via the scooter controller 118.

Figure 3:
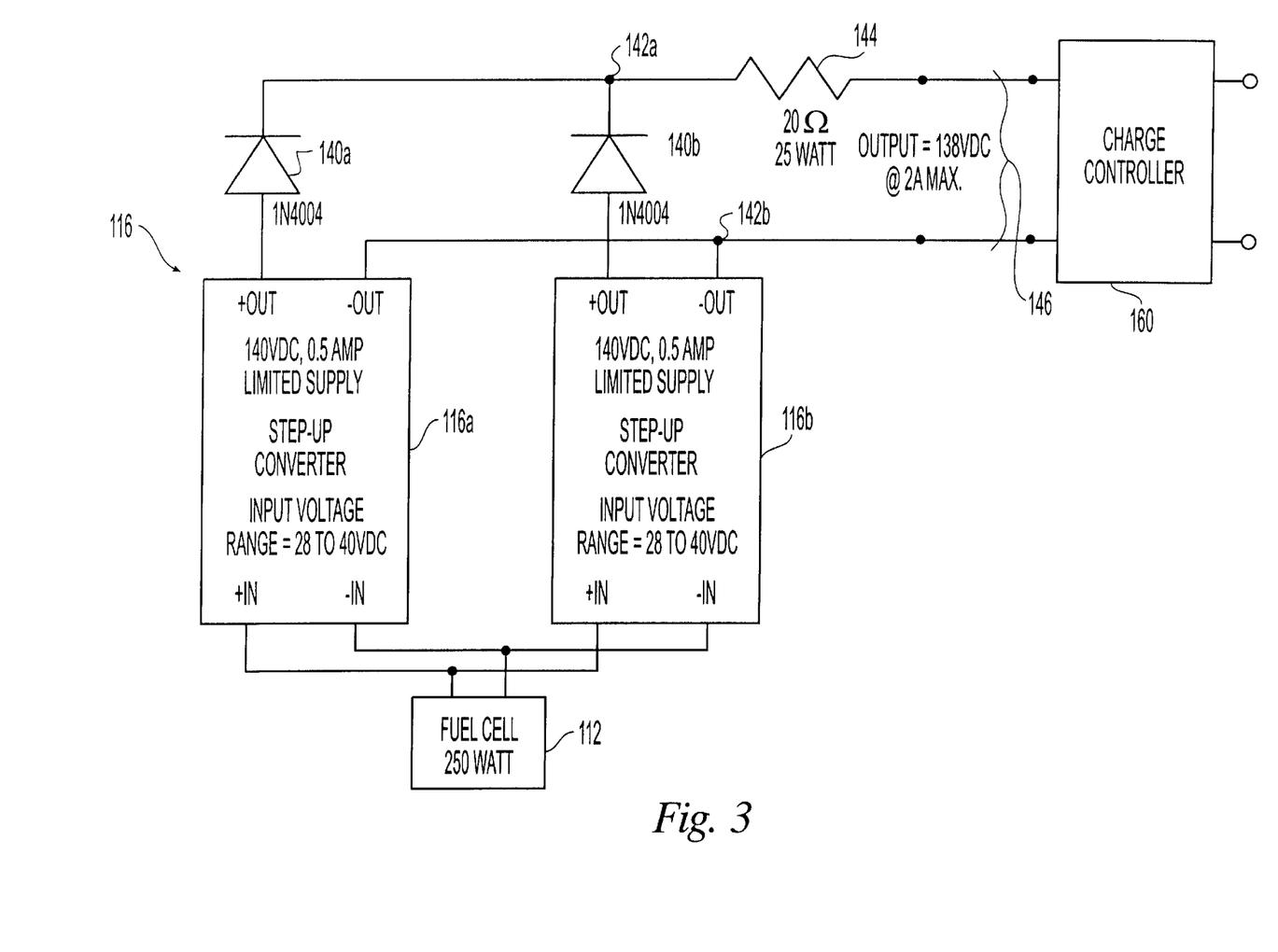
FIG. 3 shows a DC-DC converter in accordance with one embodiment of the present invention.

FIG. 3 shows a DC—DC converter/charge controller 116 which can be used to convert the output of the fuel cell 112 into a voltage suitable for charging the battery pack 104. The converter/charge controller comprises a pair of step-up converters 116*a*, 116*b* arranged in parallel. Though only two converters are shown here, it should be kept in mind that any number of converters may connected in parallel to deliver the current required by the battery to sustain effective charging. The step-up converters 116*a*, 116*b* preferably have an input voltage range on the order of 28–40 VDC and output approximately 140 VDC at 0.5 amps. Positive output terminals of the step-up converters 116*a*, 116*b* are passed through respective diodes 140*a*, 140*b*, which preferably both are of the 1N4004 type. This is done to ensure that the battery bus voltage does not leak current back through the step-up converter in the event that the fuel cell is switched off. The output from the step-converters is combined at a positive node 142*a* and negative node 142*b*. Node 142*a* is connected to a 20 ohm, 25 watt current limiting resistor 144. In this manner, the DC—DC converter/charge controller provides an output of approximately 138 volts at a maximum draw of 2 amps at output port 146.

Figure 4:
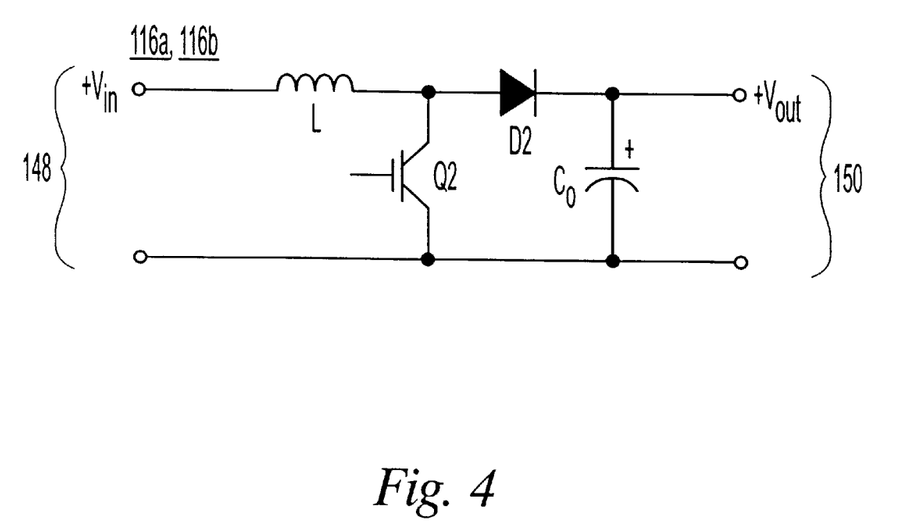
FIG. 4 shows a step-up converter of the sort used in the DC—DC converter of FIG. 3.

FIG. 4 depicts an exemplary step-up (boost) converter 116*a*, 116*b*. A step-up (boost) converter is used to produce higher voltage at the load than at the supply voltage. When power switch Q2 is on, the inductor L is connected to the DC source at the input port 148 and the energy from the DC source is stored in the inductor L. When the power switch Q2 is switched off, the energy stored in the collapsing field of inductor L causes the voltage on the anode of diode D2 to rise sharply. Current flowing through diode D2 raises the voltage on filter capacitor Co. In this manner, the output voltage at the output port 150 is higher than the voltage at the input port 148.

As seen in FIG. 3, the output port 146 of the DC—DC converter 116 is applied to a charge controller 160. Charge controller 160 is of the sort described in U.S. Pat. No. 5,965,996. Charge controller 160 is capable of controlling power to a nominal 120 volt DC battery pack 114. The charge controller 160 charges a battery pack first using a constant current until the battery pack reaches 140 volts, then applies a constant voltage at 140 volts and then reapplies a constant current until the battery pack reaches 156 volts. Each of these voltage set points may be specified under the control of the scooter controller. In this respect, the scooter controller enables the DC—DC converter 116 to continue to charge the battery pack via the charge controller 160 until the battery becomes fully charged or the operator elects to shut down the system. In this manner, the charge controller provides over-current and over-voltage limit protection. Furthermore, the charge controller is configured to minimize ripple current applied to the battery pack and is also configured to provide temperature compensation consistent with the variability of gassing voltage requirements.

The battery gauge 120 preferably comprises a collection of LEDs and optimally also includes a traditional analog or digital gauge in addition to the LEDs to convey the state of battery charge. With regard to the LEDs associated with the battery gauge, a red LED, when lit, indicates that the fuel cell is active; a yellow LED, when active, indicates that the battery pack is charged to a predetermined percentage, e.g. 80%; and a green LED, when lit, indicates that the battery pack is fully charged. In this manner, the battery gauge informs a user of the status of the battery pack.

Figure 5:
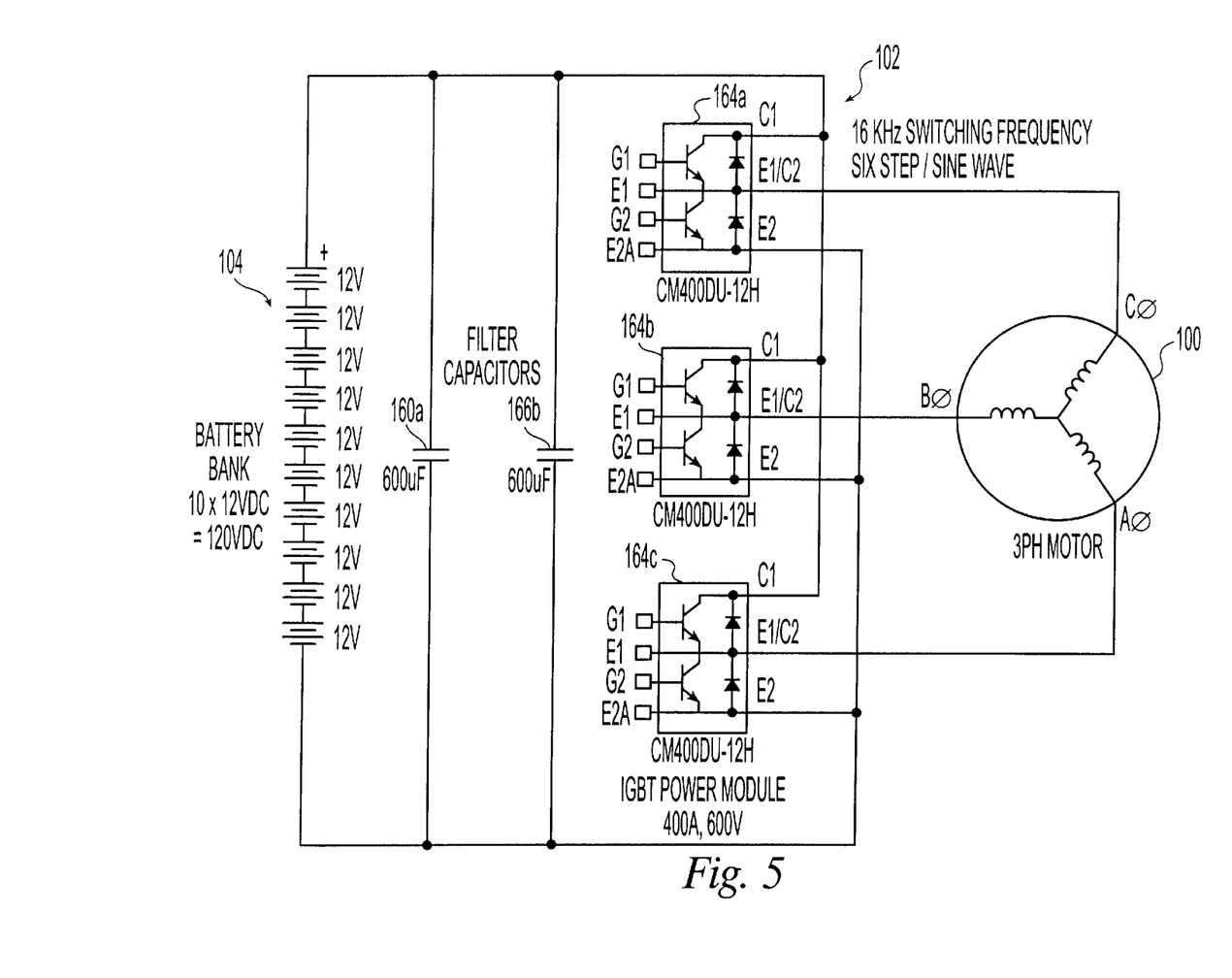
FIG. 5 diagrams a motor controller of the sort used in the present invention.

FIG. 5 illustrates the scooter motor controller 102 of the present invention in conjunction with the scooter motor 100 and the battery pack 104. Motor controller 102 preferably comprises a controller device such as the Ti-TMS 320F240 DSP chip available from Texas instruments. The scooter motor controller 102 comprises three model no. CM400DU-12H IGBT's made by Powerex (www.pwrx.com) of Youngwood, Pa. These IGBT's have a peak rating of 400 amps and 600 volts and can sustain a maximum continuous current of 100 amps. The DSP chip preferably applies a switching frequency of 16 kHz using a six step sine wave switching mode via the IGBT's. The input voltage applied to the IGBT's is the 120 volt nominal battery bank 104 which may be implemented either as lead-acid batteries typically having an 80–130 volt operating range, or Ni—Zn batteries having a 90–140 volt operation range.

Figure 6A:
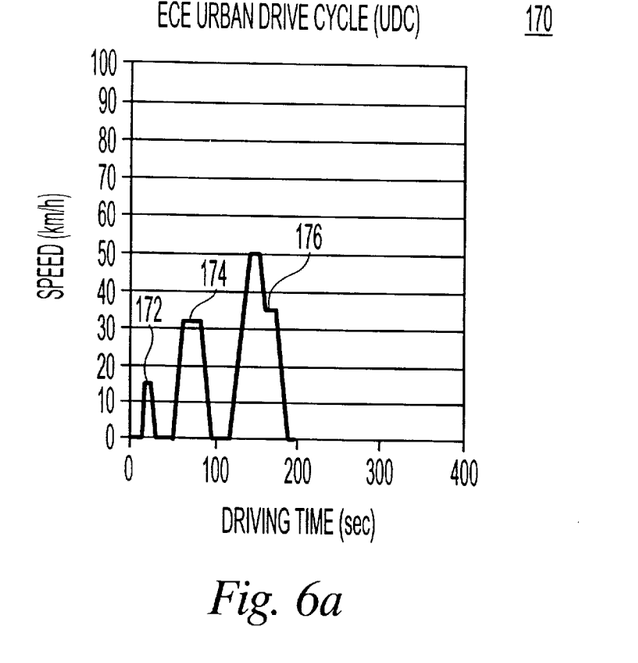
FIGS. 6a & 6b show velocity profiles as a function of time, for both extra urban and urban scooter travel, respectively.

As a practical matter, individuals using a scooter for purely urban operation have different power and endurance requirements than individuals using a scooter in extra urban environments. This is because in urban environments, the distances traveled are short, there is frequent stopping and starting, and average speeds are low. This places one set of demands upon an electric scooter. In contrast, extra urban settings are characterized by infrequent stops and starts with sustained periods of high velocity travel. This places a different kind of demand upon an electric scooter. FIG. 6a shows time vs. speed profile 170 for a single trip. Each of curves 172, 174, 176 represents the time-speed profile for a single stop/start leg during the single trip. As seen in the profile 170 the maximum duration of any of the legs is somewhat less that 100 seconds and the maximum speed reached during any of these legs is on the order of 50 km/hr. Thus, an electric scooter configured to operate efficiently in urban setting, must be able to accelerate and decelerate quite often, but need not maintain a high rate of speed for sustained periods of time.

Figure 6B:
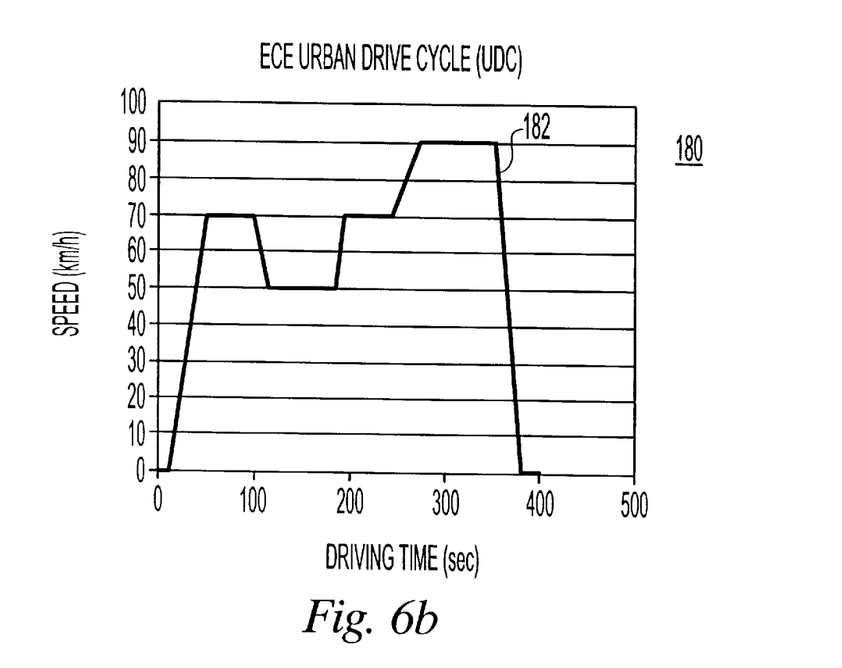

As seen in FIG. 6b, an extra urban setting may require a scooter to sustain a velocity of at least 50 km/h for several hundred seconds in a single leg. Thus, a scooter configured to operate in an extra urban setting need not accelerate or decelerate as often but would be required to sustain high levels of speed.

Figure 7A:
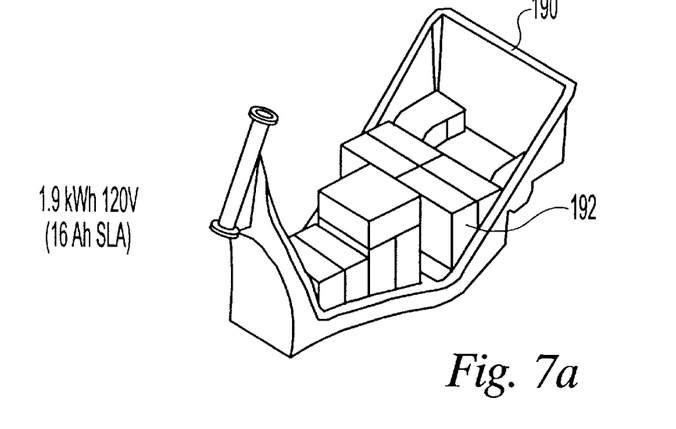
FIGS. 7a–7c show the arrangement of different types of batteries in a scooter.

Thus, it may be expedient to design an electric scooter based on the expected type of setting (urban vs. extra urban) in which that scooter is expected to operate. Accordingly, one may select the number and type of batteries used in the battery pack 104, based upon the expected environment in which the electric scooter is to operate. It should be evident to one skilled in the art, that reducing the number of batteries, or the rating of batteries, in the aggregate, reduces costs of an electric scooter. Accordingly, economic benefits may be realized if electric scooters were designed with the intended operating environment in mind. FIG. 7a shows a scooter frame 190 holding ten 12 volt sealed lead-acid (SLA) batteries 192, each battery having a 16 amp-hour rating for a total of approximately 1.9 kilowatt hours at 120 volts.

Figure 7B:
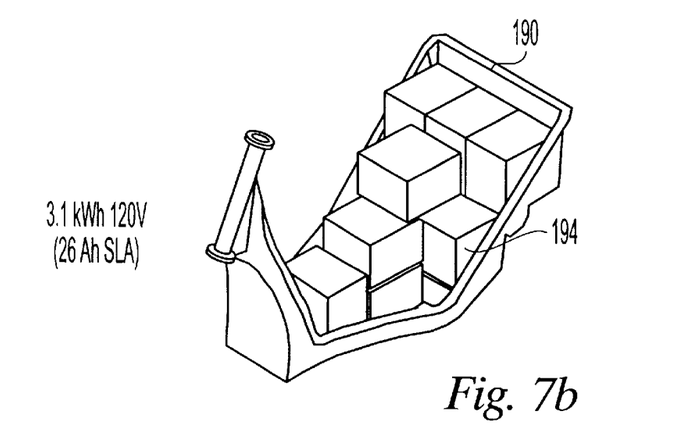
Figure 7C:
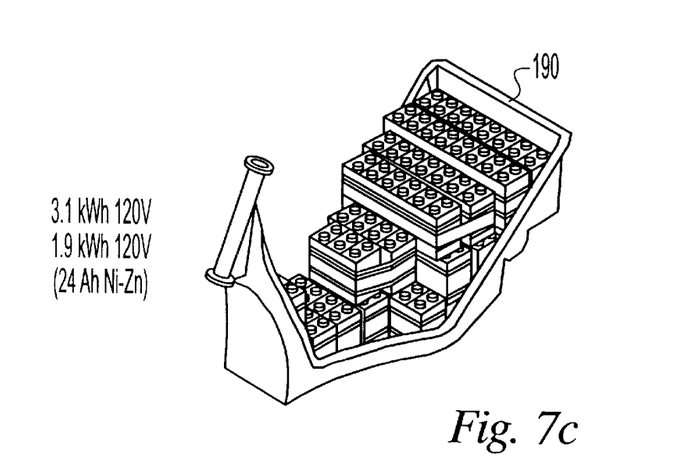

FIG. 7b shows the same frame holding ten 12 volt SLA batteries 194, each battery having a rating of 26 amp-hours for a total of 3.1 kilowatt hours at 120 volts. Because the 26 amp-hour batteries 194 are larger than the 16 amp hour batteries, the larger batteries occupy more space in the frame. FIG. 7c shows a multiplicity of 24 amp-hour Ni—Zn batteries which have less mass for the same energy capacity relative to SLA batteries, albeit at higher cost.

Figure 8A:
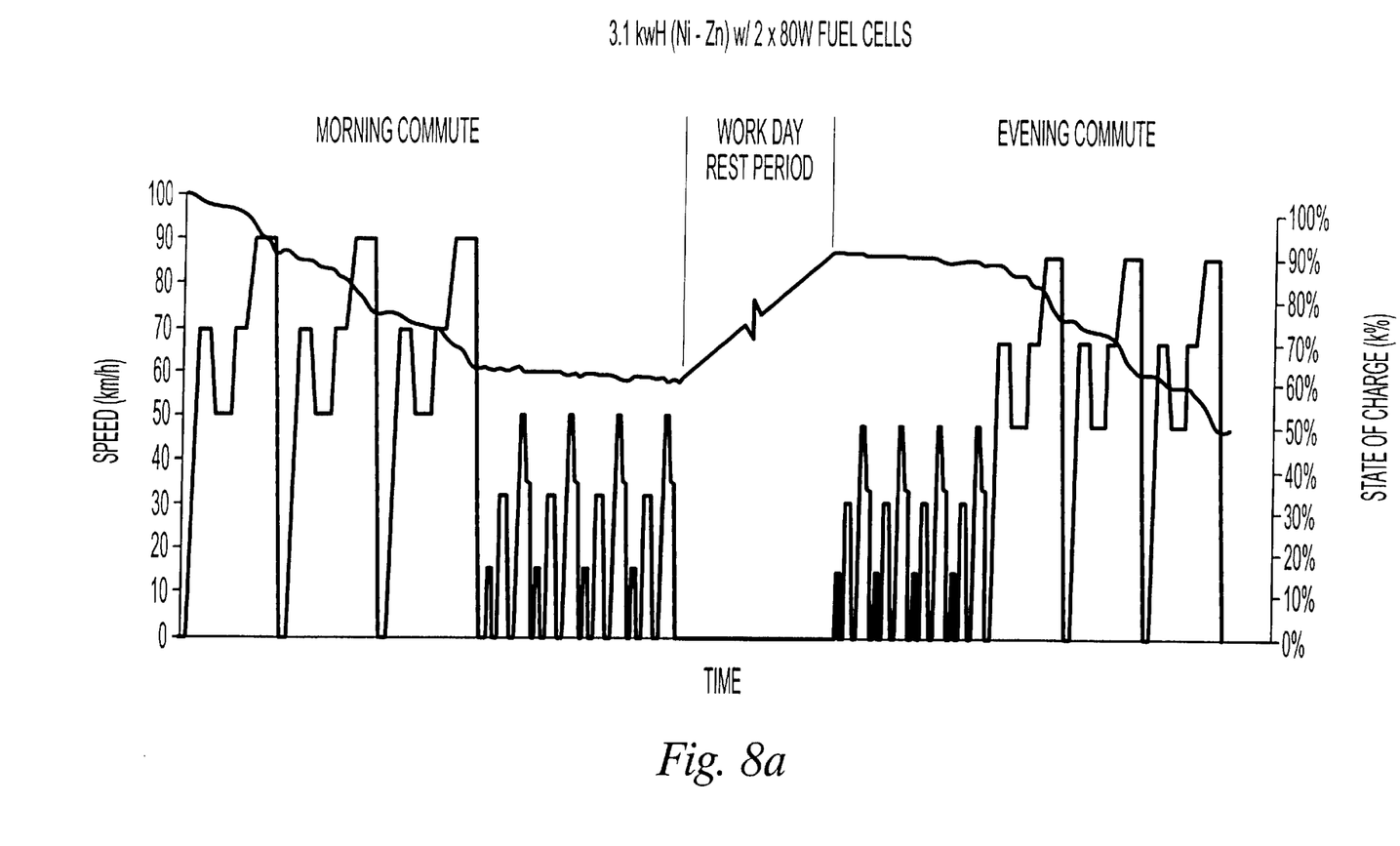
FIGS. 8a & 8b show rider and corresponding battery state of charge (SOC) as profiles for scooter use.

FIG. 8a shows a speed profile and the state of charge (SOC) as a function of time for an electric scooter configured for extra urban driving, the scooter being provided with a 3.1 kilowatt capacity Ni—Zn battery pack and using dual 80 watt fuel cells arranged in parallel. During the morning commute, the battery SOC drops from 100% to 60%. During the work day, with the scooter parked and the fuel cell operating, the battery pack recovers to 90% SOC. At the end of the evening commute, the battery SOC is reduced to 50%. At rest overnight, the fuel cell will return the battery SOC to 100% to start the cycle over again, thus making the vehicle fully sustainable and consequently a reliable means for commuting.

Figure 8B:
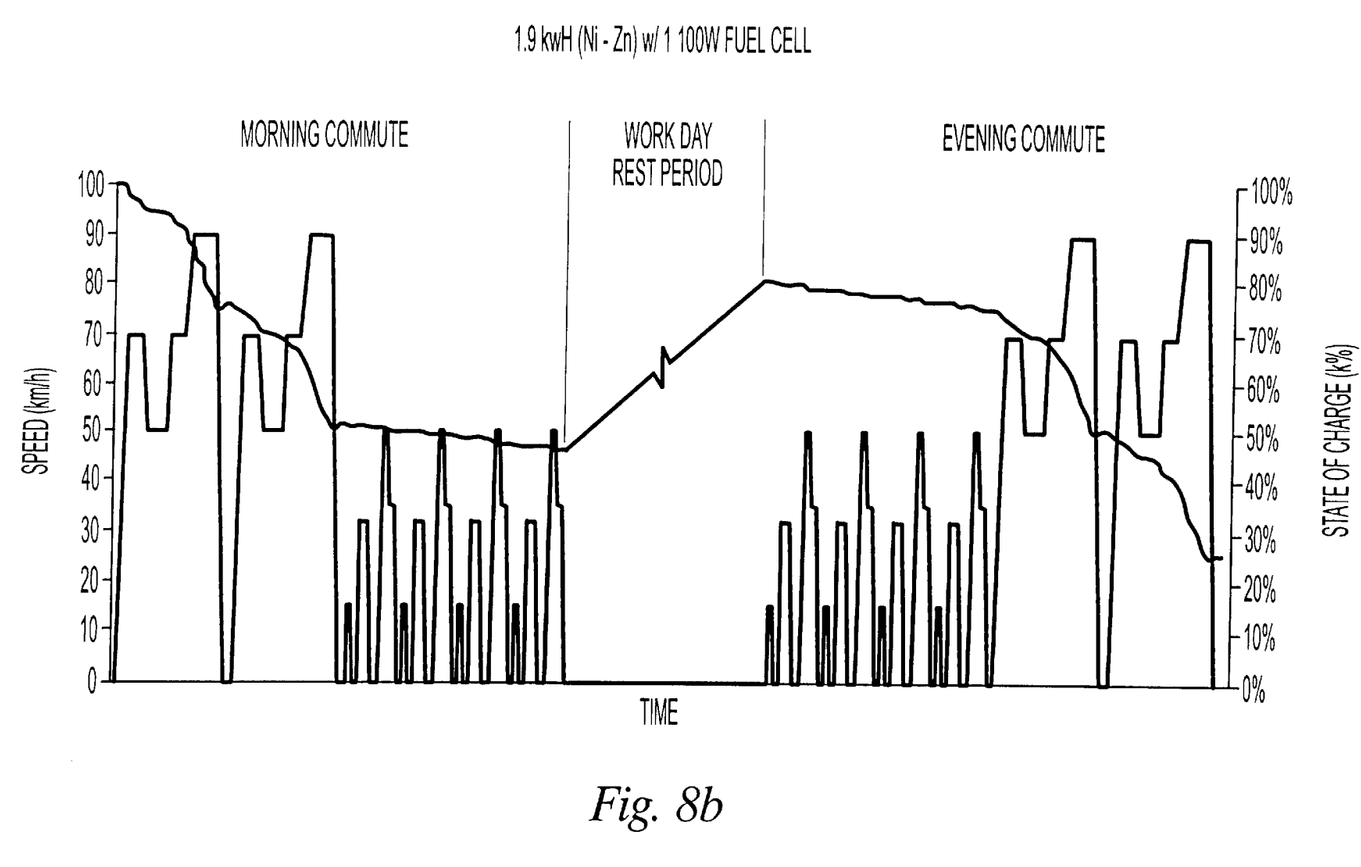

FIG. 8b shows the speed and state of charge as a function of time for an electric vehicle configured for urban driving having a 1.9 kilowatt hour capacity Ni—Zn battery pack and a single 100 watt fuel cell. As compared to the commuting pattern shown in FIG. 8a, FIG. 8b has one fewer extra urban cycles in each of the morning and evening commute legs. The reduced battery capacity, however, is sufficient to sustain the vehicle as a viable means for the commuting pattern shown.

As seen in FIGS. 8a and 8b, the morning commute reduces the state of charge of a fully charged battery pack to a certain level and the state of charge recovers during the course of the day between the morning commute and the evening commute due to recharging caused by the fuel cell(s). However, the battery pack is not recharged in either FIG. 8a or 8b to 100 percent of its capacity. In both FIGS. 8a and 8b, during the evening commute, the state of charge is reduced gradually during the stop and go phase (presumably close to one's office) and is reduced considerably during the latter phase (presumably closer to one's home and away from the office area). Nevertheless, regardless of its initial capacity, the fuel cell is preferably able to fully charge the battery pack after day normal user. And on those days during which the vehicle is used more than normal, additional charging from an external power source may be used overnight to prepare the electric scooter for the following morning.

While both FIGS. 8a and 8b show that the state of charge is reduced somewhat steeply at the high speeds, it is noted that the state of charge in the electric scooter of FIG. 8b is decreased to a lesser extent than the electric scooter of FIG. 8a which is provided with a battery pack having a capacity of 3.1 kilowatt hours.

In a first preferred embodiment, the battery supply 104 comprises lead acid batteries available from the Hawker Energy Group at (www.hepi.com) of Missouri. Preferably, the lead acid batteries are either the Genesis model no. G16EP (16 Amp-hour) or model no. G26EP (26 Amp-hour). The lower amp-hour rating batteries are used when the scooter is designed to commute only a small distance within an urban area whereas the 26 amp-hour batteries are used when the scooter is designed to travel in suburban as well as urban areas with a longer commuting distance.

In a second preferred embodiment, nickel zinc (Ni—Zn) batteries may be used instead of the lead-acid type. Preferably sealed Ni—Zn batteries from Evercel Corporation (www.evercel.com) of Danbury, Conn., are used. Evercel's model nos. 25–12 and 40–12 batteries having a nominal voltage of 12 volts and a capacity of 22 and 30 Amp-hours, respectively, are suited for use in the present invention.

To charge the batteries from an external power source, a battery charger is required. For lead acid batteries, preferably, a model no. K2 battery charger available from Zivan of Poviglio, Italy is used. If, on the other hand, Ni—Zn batteries are used, a Zivan model no. NG3 battery charger is preferably used. Both battery chargers can be plugged into a 120 volt, 60 Hz AC power supply. For European and other uses, chargers capable of operating from a 220 volt, 50 Hz AC power supply are also available.

In the above embodiment, we have assumed that a fuel cell is used as the onboard recharging source 112. In a second embodiment, the onboard recharging source is an internal combustion engine. In such case, preferably a Honda model no. EU100I engine is used. This engine has an integrated fuel tank and is manually started. The single phase engine drives a mechanical charging unit, such as an alternator or generator. The engine has a rated output of 900VA with a maximum output of 1000VA and cooperates with the mechanical charging unit to put out a 120 volt, 60 Hz signal for charging the batteries. This output is conditioned to provide appropriate charging of the battery pack. Furthermore, because the internal combustion engine is air-breathing, air inlet and exhaust hardware must be provided in this embodiment. In addition, a standard gasoline-type fuel gauge would be provided to inform the operator of the fuel level, as would a keyed switch to start and stop the engine.

Finally, while the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A two wheeled electric scooter comprising:
   a scooter frame including a compartment shaped and sized to accommodate a battery power supply;
   an electric motor connected to said battery power supply via at least one switch, the electric motor configured to drive a rear wheel of the scooter;
   an onboard power source configured to charge the battery power supply;
   a first charging circuit configured to connect the onboard power source to the battery power supply;
   a second charging circuit configured to connect the battery power supply to an external power source; and
   a motor controller circuit connected to the motor and configured to charge the battery power supply upon deceleration of the scooter.

2. The electric scooter of claim 1, wherein:
   the onboard power source comprises a fuel cell configured to trickle charge the battery supply via said first circuit; and
   a fuel tank configured to hold a fuel suitable for running the fuel cell.

3. The electric scooter according to claim 2, wherein the trickle charge output by the fuel cell is less than 2 amps.

4. The electric vehicle according to claim 2, wherein the fuel is one from the group consisting of hydrogen and methanol.

5. The electric vehicle according to claim 1, wherein the onboard power source comprises an internal combustion engine configured to drive a mechanical charging unit connected to charge the battery power supply; and
   a fuel tank configured to hold a fuel suitable for running the internal combustion engine.

6. The electric scooter according to claim 5, wherein the engine and mechanical charging unit cooperate to output a maximum electrical current of 10 amps DC.

7. The electric vehicle according to claim 1, wherein the battery power supply has a voltage of at least 100 volts.

8. The two wheeled electric scooter according to claim 1, wherein the first charging circuit comprises a boost converter which receives a first voltage output by the fuel cell and outputs a second voltage to the battery power supply, the second voltage being greater than the first voltage.

9. A two wheeled electric scooter comprising:
   a scooter frame including a compartment shaped and sized to accommodate a battery power supply;
   an electric motor connected to said battery power supply via at least one switch, the electric motor configured to drive a rear wheel of the scooter;
   at least one fuel cell configured to trickle charge the battery supply;
   a first charging circuit configured to connect the fuel cell to the battery power supply so as to charge the battery power supply;
   a fuel tank configured to hold a fuel suitable for running the fuel cell;
   a second charging circuit configured to connect the battery power supply to an external power source; and
   a motor controller circuit connected to the motor and configured to charge the battery power supply upon deceleration of the scooter.

10. The two wheeled electric scooter according to claim 9, wherein the first charging circuit comprises a boost converter which receives a first voltage output by the fuel cell and outputs a second voltage to the battery power supply, the second voltage being greater than the first voltage.

11. The electric scooter according to claim 9, wherein the trickle charge output by the fuel cell is less than 2 amps.

12. The electric vehicle according to claim 11, wherein the fuel is one from the group consisting of hydrogen and methanol.

13. The electric vehicle according to claim 12, wherein the battery power supply has a voltage of at least 100 volts.

14. A two wheeled electric scooter comprising:
- a scooter frame including a compartment shaped and sized to accommodate a battery power supply having a voltage of at least 100 volts;
- an electric motor connected to said battery power supply via at least one switch, the electric motor configured to drive a rear wheel of the scooter;
- fuel cell configured to trickle charge the battery supply, the fuel cell running on either hydrogen or methanol, the fuel cell outputting a trickle charge of less than 2 amps;
- a first charging circuit configured to connect the fuel cell to the battery power supply so as to charge the battery power supply, the first charging circuit including a boost converter which receives a first voltage by the cell and outputs a second voltage to the battery power supply, the second voltage being greater than the first voltage,
- a fuel tank configured to hold the hydrogen or methanol fuel;
- a second charging circuit configured to connect the battery power to an external power source; and
- a motor controller circuit connected to the motor and configured to charge the battery power supply upon deceleration of the scooter.

* * * * *